United States Patent
Bennah et al.

(10) Patent No.: US 9,645,815 B2
(45) Date of Patent: *May 9, 2017

(54) DYNAMICALLY RECOMMENDING CHANGES TO AN ASSOCIATION BETWEEN AN OPERATING SYSTEM IMAGE AND AN UPDATE GROUP

(71) Applicant: International Business Machines Corporation, Armonk, NY (US)

(72) Inventors: Albert D. Bennah, Cary, NC (US); Adrian X. Rodriguez, Durham, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/792,806

(22) Filed: Jul. 7, 2015

(65) Prior Publication Data

US 2015/0309791 A1    Oct. 29, 2015

Related U.S. Application Data

(63) Continuation of application No. 13/973,073, filed on Aug. 22, 2013, now Pat. No. 9,110,766, which is a
(Continued)

(51) Int. Cl.
*G06F 9/44* (2006.01)
*G06F 9/45* (2006.01)
(Continued)

(52) U.S. Cl.
CPC .................. *G06F 8/71* (2013.01); *G06F 8/60* (2013.01); *G06F 8/65* (2013.01); *G06F 9/4406* (2013.01);
(Continued)

(58) Field of Classification Search
CPC   G06F 8/60–8/73; G06F 8/20; G06F 9/45533; G06F 8/30–8/38;
(Continued)

(56) References Cited

U.S. PATENT DOCUMENTS 6,272,626 B1    8/2001    Cobbett
6,330,715 B1   12/2001    Razzaghe-Ashrafi
(Continued)

FOREIGN PATENT DOCUMENTS

WO    WO 2012/048030 A2    4/2012

OTHER PUBLICATIONS

Christoph Steiger, Operating Systems for Reconfigurable Embedded Platforms: Online Scheduling of Real-Time tasks, 2004, pp. 1-15.*

(Continued)

*Primary Examiner* — Thuy Dao
*Assistant Examiner* — Mongbao Nguyen
(74) *Attorney, Agent, or Firm* — Brandon C. Kennedy; Grant A. Johnson; Kennedy Lenart Spraggins LLP

(57) ABSTRACT

Dynamically recommending changes to an association between an operating system image and an update group includes monitoring a configuration of a deployed copy of a first master operating system (OS) image; detecting a modification in the configuration of the deployed copy; determining that the configuration of the deployed copy with the modification more closely matches a configuration of a second master OS image than a configuration of the first master OS image; in response to determining that the configuration of the deployed copy with the modification more closely matches the configuration of the second master OS image, generating an association recommendation that recommends associating the deployed copy with a second update group of the second master OS image; and associ-
(Continued)

ating the deployed copy with the second update group of the second master OS image instead of the first update group of the first master OS image.

18 Claims, 6 Drawing Sheets

Related U.S. Application Data continuation of application No. 13/653,090, filed on Oct. 16, 2012, now Pat. No. 8,990,772.

(51) Int. Cl.
  *G06F 9/445* (2006.01)
  *G06F 11/30* (2006.01)

(52) U.S. Cl.
  CPC ...... *G06F 9/44505* (2013.01); *G06F 11/3051* (2013.01); *G06F 8/63* (2013.01); *G06F 11/30* (2013.01); *G06F 11/3003* (2013.01); *G06F 2201/865* (2013.01)

(58) Field of Classification Search
  CPC .......................... G06F 9/4406–9/44505; G06F 11/30–11/3051; G06F 2201/865
  See application file for complete search history.

(56) References Cited

U.S. PATENT DOCUMENTS

| | | |
|---|---|---|
| 6,513,115 B2 | 1/2003 | Nock et al. |
| 7,240,107 B2 | 7/2007 | Chase-Salerno |
| 7,600,216 B2 | 10/2009 | Shlomai |
| 7,694,280 B2 | 4/2010 | James et al. |
| 7,757,214 B1 | 7/2010 | Palczak et al. |
| 7,802,246 B1 | 9/2010 | Kennedy et al. |
| 7,890,951 B2 | 2/2011 | Vinberg |
| 8,117,168 B1 | 2/2012 | Stringham |
| 8,181,174 B2 | 5/2012 | Liu |
| 8,219,983 B1 | 7/2012 | Sobel et al. |
| 8,239,509 B2 | 8/2012 | Ferris et al. |
| 8,296,251 B1 | 10/2012 | Athayde |
| 8,347,280 B2 | 1/2013 | Swarna |
| 8,352,608 B1 | 1/2013 | Keagy et al. |
| 8,381,191 B2 | 2/2013 | Mondal |
| 8,423,958 B2 | 4/2013 | Velupillai |
| 8,429,630 B2 | 4/2013 | Nickolov |
| 8,468,518 B2 | 6/2013 | Wipfel |
| 8,612,566 B2 | 12/2013 | Ferris et al. |
| 8,627,293 B2 | 1/2014 | Perrone et al. |
| 8,635,686 B2 | 1/2014 | Sriram |
| 8,869,135 B1 | 10/2014 | Fitzgerald et al. |
| 8,990,772 B2 | 3/2015 | Bennah |
| 8,990,796 B2 | 3/2015 | Lamantia |
| 2002/0124245 A1 | 9/2002 | Maddux |
| 2003/0051128 A1 | 3/2003 | Rodriguez et al. |
| 2003/0130980 A1* | 7/2003 | Bell .................... G06F 9/44505 |
| 2004/0025154 A1 | 2/2004 | Sedlack |
| 2004/0060035 A1* | 3/2004 | Ustaris ...................... G06F 8/71 7/100 |
| 2004/0153478 A1 | 8/2004 | Igouchkine |
| 2004/0162876 A1 | 8/2004 | Kohavi |
| 2004/0181776 A1 | 9/2004 | Atkin et al. |
| 2004/0230731 A1 | 11/2004 | Arimilli et al. |
| 2005/0086642 A1* | 4/2005 | Runte ........................ G06F 8/71 7/122 |
| 2005/0235352 A1 | 10/2005 | Staats et al. |
| 2006/0010425 A1* | 1/2006 | Willadsen .................. G06F 8/71 717/120 |
| 2006/0037016 A1 | 2/2006 | Saha |
| 2006/0161895 A1 | 7/2006 | Speeter et al. |
| 2006/0184937 A1 | 8/2006 | Abels et al. |
| 2006/0248139 A1 | 11/2006 | Sundar |
| 2006/0248513 A1 | 11/2006 | Foster et al. |
| 2007/0074164 A1* | 3/2007 | Stienhans ................. G06F 8/71 7/120 |
| 2007/0180509 A1 | 8/2007 | Swartz et al. |
| 2007/0226358 A1 | 9/2007 | Krywaniuk |
| 2007/0240151 A1 | 10/2007 | Marl |
| 2007/0283321 A1* | 12/2007 | Hegde ....................... G06F 8/71 717/110 |
| 2007/0283324 A1 | 12/2007 | Geisinger |
| 2007/0283329 A1 | 12/2007 | Caprihan et al. |
| 2008/0028042 A1* | 1/2008 | Bealkowski ........ H04L 41/0803 709/219 |
| 2008/0052675 A1 | 2/2008 | Wookey |
| 2008/0098379 A1 | 4/2008 | Newman et al. |
| 2008/0104573 A1 | 5/2008 | Singla et al. |
| 2008/0141010 A1 | 6/2008 | Crowell et al. |
| 2008/0141217 A1 | 6/2008 | Goetz et al. |
| 2008/0155534 A1 | 6/2008 | Boss et al. |
| 2008/0184200 A1 | 7/2008 | Burns et al. |
| 2008/0222606 A1* | 9/2008 | Solirov ............... G06F 11/3672 717/122 |
| 2009/0016220 A1 | 1/2009 | Uysal et al. |
| 2009/0019438 A1 | 1/2009 | Madduri et al. |
| 2009/0019535 A1 | 1/2009 | Mishra et al. |
| 2009/0037680 A1 | 2/2009 | Colbert et al. |
| 2009/0048993 A1 | 2/2009 | Lohrbach et al. |
| 2009/0089624 A1 | 4/2009 | Austen et al. |
| 2009/0100420 A1 | 4/2009 | Sapuntzakis et al. |
| 2009/0118839 A1 | 5/2009 | Accapadi et al. |
| 2009/0210852 A1* | 8/2009 | Martineau ................. G06F 8/71 7/101 |
| 2009/0228868 A1 | 9/2009 | Drukman et al. |
| 2009/0265707 A1 | 10/2009 | Goodman et al. |
| 2009/0282404 A1* | 11/2009 | Khandekar ......... G06F 9/45558 718/1 |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300607 A1 | 12/2009 | Ferris et al. |
| 2009/0300641 A1 | 12/2009 | Friedman et al. |
| 2009/0300707 A1 | 12/2009 | Garimella et al. |
| 2010/0037207 A1 | 2/2010 | Chambers et al. |
| 2010/0077380 A1* | 3/2010 | Baker ....................... G06F 8/72 7/120 |
| 2010/0125840 A1* | 5/2010 | Schneider ................. G06F 8/65 7/172 |
| 2010/0153443 A1 | 6/2010 | Gaffga et al. |
| 2010/0162221 A1* | 6/2010 | Laicher ..................... G06F 8/71 7/168 |
| 2010/0169874 A1* | 7/2010 | Izard ........................ G06F 8/71 7/170 |
| 2010/0192143 A1 | 7/2010 | Ingle et al. |
| 2010/0229175 A1 | 9/2010 | Gonzalez et al. |
| 2010/0257523 A1 | 10/2010 | Frank |
| 2010/0274890 A1 | 10/2010 | Patel et al. |
| 2010/0281473 A1* | 11/2010 | Zhang ....................... G06F 8/65 717/171 |
| 2010/0325410 A1 | 12/2010 | Fitzgerald et al. |
| 2010/0332637 A1 | 12/2010 | Doi et al. |
| 2010/0332890 A1 | 12/2010 | Chen et al. |
| 2011/0010700 A1* | 1/2011 | Lanner ............... G06F 9/44505 717/170 |
| 2011/0016414 A1 | 1/2011 | Ernst et al. |
| 2011/0126168 A1 | 5/2011 | Ilyayev |
| 2011/0131301 A1 | 6/2011 | Klein et al. |
| 2011/0145789 A1 | 6/2011 | Rasch et al. |
| 2011/0154320 A1 | 6/2011 | Verma |
| 2011/0161952 A1 | 6/2011 | Poddar et al. |
| 2011/0173605 A1 | 7/2011 | Bourne |
| 2012/0030459 A1 | 2/2012 | Aldridge et al. |
| 2012/0030672 A1 | 2/2012 | Zygmuntowicz et al. |
| 2012/0054868 A1 | 3/2012 | Ramalingam |
| 2012/0079474 A1 | 3/2012 | Gold et al. |
| 2012/0084414 A1 | 4/2012 | Brock et al. |
| 2012/0084752 A1 | 4/2012 | Arnold et al. |
| 2012/0102160 A1 | 4/2012 | Breh et al. |
| 2012/0102481 A1 | 4/2012 | Mani et al. |
| 2012/0131577 A1 | 5/2012 | Arcese et al. |

(56) References Cited

U.S. PATENT DOCUMENTS

| | | | |
|---|---|---|---|
| 2012/0137278 A1* | 5/2012 | Draper | G06F 8/65 717/170 |
| 2012/0159471 A1 | 6/2012 | de Souza et al. | |
| 2012/0167048 A1 | 6/2012 | Walsh et al. | |
| 2012/0192175 A1* | 7/2012 | Dorai | G06F 9/45558 718/1 |
| 2012/0197972 A1* | 8/2012 | Tukol | G06F 9/44505 709/203 |
| 2012/0246619 A1 | 9/2012 | Thirumalai et al. | |
| 2012/0254380 A1* | 10/2012 | Sobel | G06F 9/44505 709/221 |
| 2012/0278797 A1 | 11/2012 | Secrist et al. | |
| 2012/0284405 A1 | 11/2012 | Ferris et al. | |
| 2012/0311106 A1* | 12/2012 | Morgan | H04L 41/0806 709/220 |
| 2013/0067049 A1 | 3/2013 | Ghosh et al. | |
| 2013/0080619 A1 | 3/2013 | Assuncao et al. | |
| 2013/0080997 A1 | 3/2013 | Dattathreya | |
| 2013/0125107 A1 | 5/2013 | Bandakka et al. | |
| 2013/0138718 A1 | 5/2013 | Mallur et al. | |
| 2013/0254765 A1* | 9/2013 | Shinohara | G06F 9/45533 718/1 |
| 2013/0332921 A1 | 12/2013 | Khutornenko et al. | |
| 2014/0033188 A1 | 1/2014 | Beavers et al. | |
| 2014/0033189 A1 | 1/2014 | Buswell | |
| 2014/0040438 A1 | 2/2014 | Donahue et al. | |
| 2014/0052683 A1 | 2/2014 | Kirkham et al. | |
| 2014/0075172 A1 | 3/2014 | Knichel et al. | |
| 2014/0101421 A1 | 4/2014 | Bennah et al. | |
| 2014/0101422 A1 | 4/2014 | Bennah et al. | |
| 2014/0101428 A1 | 4/2014 | Bennah et al. | |
| 2014/0101429 A1 | 4/2014 | Bennah et al. | |
| 2014/0101430 A1 | 4/2014 | Bennah et al. | |
| 2014/0101431 A1 | 4/2014 | Bennah et al. | |
| 2014/0108779 A1 | 4/2014 | Bennah et al. | |
| 2014/0108951 A1 | 4/2014 | Dharawat et al. | |
| 2014/0157056 A1 | 6/2014 | Bennah et al. | |
| 2014/0259009 A1 | 9/2014 | Bhattiprolu | |

OTHER PUBLICATIONS

R. Cwiakala, MVS Dynamic Reconfiguration Management, 1992, pp. 1-14.*
A. Ganguly, Reducing Complexity of Software Deployment with Delta Configuration, 2007, pp. 1-4.*
Redhat, Best Practices for Deploying and Managing Linux with Red Hat Network, 2005, pp. 1-27.*
Microsoft, Operating System Deployment in Configuration Manager, 2007, pp. 1-29.*
Bicknell, Software Development and Configuration Management in the Cronus Distributed Operating System, 2002, pp. 143-147.*
Microsoft, Configure Automatic Updates using Group Policy, 2011, pp. 1-10.*
Choi, H., et al., "Autonomous Learning for Efficient Resource Utilization of Dynamic VM Migration", ICS'08, Jun. 2008, pp. 185-194, ACM, USA.
Venners, B., "The Java Virtual Machine", Chapter 5 of Inside the Java Virtual Machine, www.artima.com (online), [accessed Jul. 6, 2012], 53 pp., URL: http://www.artima.com/insidejvm/ed2/jvmP.html.
Hudson, "Hyper-V Virtual Machine (VM) Parent-Child Configuration Using Differencing Disks", Microsoft TechNet Article, Sep. 2010, [accessed Aug. 7, 2012], 2 pp., URL: http://social.technet.microsoft.com/wiki/contents/articles/1393.hyper-v-virtual-machine-vm-parent-child-configuration-using-differencing-disks.aspx.
"Vsphere 5: Updating/Installing profile or vib using esxcli", virtualvm.info (online), May 2012, [accessed Aug. 7, 2012], 3 pp., URL: http://virtualvm.info/?p=170.
Oasysadmin, "Copying, moving and replicating the MDT 2010 deployment share", Nov. 2011, pp. 1-9, oasysadmin.com (online), URL: oasysadmin.com/2011/11/03/copying-moving-and-replicating-the-mdt-2010-deployment-share/.
Bell et al., "Configuration Description, Deployment, and Lifecycle Management (CDDLM) Foundation Document", GFD.50, Aug. 2005, 37 pages, Global Grid Forum (online), URL: www.ogf.org/documents/GFD.50.pdf.
Rasmussen etal., "Managing WebSphere DataPower Device configurations for high availability, consistency, and control, Part 2: Application promotion strategies", IBM developerWorks, WebSphere Technical Library, Apr. 2009, 15 pages, IBM developerWorks (online), URL: www.ibm.com/developerworks/websphere/library/techarticles/0904_rasmussen/0904_rasmussen.html.
White, "How to Deploy Entire Systems in Mac OS X 10.5", Deploying System Images, peachpit.com (online), Aug. 2008, pp. 1-7, Peachpit, San Francisco, CA.
Wentzlaff, et al., "An Operating System for Multicore and Clouds: Mechanisms and Implementation", Proceedings of the 1st ACM Symposium on Cloud Computing 2010 (Socc'10), Jun. 2010, pp. 3-14, ACM New York, NY.
Scarfone, et al., "Guide to Security for Full Virtualization Technologies", Recommendations of the National Institute of Standards and Technology (NIST) Special Publication 800-125, Jan. 2011, pp. (2-1 )-(2-8), (3-1 )-(3-4) and (5-1 )-(5-4), National Institute of Standards & Technology, Gaithersburg, MD.
Zhang et al., "CCOA: Cloud Computing Open Architecture", IEEE International Conference on Web Services (ICWS), Jul. 2009, pp. 607-616, IEEE Xplore Digital Library (online), DOI: 10.1109/ICWS.2009.144.
Waldspurger, "Memory Resource Management in VMware ESX Server", ACM SIGOPS Operating Systems Review—OSDI '02: Proceedings of the 5th symposium on Operating systems design and implementation, Dec. 2002, pp. 181-194, vol. 36, Issue SI, ACM New York NY, DOI: 10.1145/844128.844146.
Badger et al., "Draft Cloud Computing Synopsis and Recommendations", National Institute of Standards and Technology (NIST) special publication 800-146, May 2012, 84 pages, nist.gov (online), URL: http://citeseerx.ist.psu.edu/viewdoc/download?doi=1 0.1.1.232.3178&rep=rep1 &type=pdf.
Makris et al., "Dynamic and Adaptive Updates of Non-Quiescent Subsystems in Commodity Operating System Kernels", Proceedings of the 2nd ACM SIGOPS/EuroSys European Conference on Computer Systems (EuroSys'07), vol. 41, Issue 3, Jun. 2007, pp. 327-340, ACM New York, NY, USA.
Chieu et al., "Virtual Machines with Sharable Operating System", Proceedings of the ACM International Conference Companion on Object Oriented Programming Systems Languages and Applications Companion (OOPSLA'11), Oct. 2011, pp. 109-114, 5 pages, ACM New York, NY, USA.

* cited by examiner

DYNAMICALLY RECOMMENDING CHANGES TO AN ASSOCIATION BETWEEN AN OPERATING SYSTEM IMAGE AND AN UPDATE GROUP

CROSS-REFERENCE TO RELATED APPLICATIONS

This application is a continuation application of and claims priority from U.S. patent application Ser. No. 13/973,073, filed on Aug. 22, 2013, which is a continuation of and claims priority from U.S. Pat. No. 8,990,772, issued Mar. 24, 2015.

BACKGROUND OF THE INVENTION

Field of the Invention

The field of the invention is data processing, or, more specifically, methods, apparatuses, and computer program products for dynamically recommending changes to an association between an operating system image and an update group.

Description of Related Art

In modern data centers, system administrators often maintain a collection of master operating system (OS) images that are reserved for deployment unto new systems as these systems become operational. A master OS image is a boot device image that includes a representation of a computer program and its related data such as a kernel, file system, configuration, and libraries at a particular given point in time. Deploying copies of a single master OS image is sometimes an efficient way to get multiple systems operational quickly. If a user of the deployed copy has to spend time changing the configuration of the deployed copy, however, the usefulness and efficiency of deployment from the master OS image is diminished.

SUMMARY OF THE INVENTION

Dynamically recommending changes to an association between an operating system image and an update group includes monitoring a configuration of a deployed copy of a first master operating system (OS) image, the deployed copy associated with a first update group of the first master OS image; detecting a modification in the configuration of the deployed copy; determining that the configuration of the deployed copy with the modification more closely matches a configuration of a second master OS image than a configuration of the first master OS image; in response to determining that the configuration of the deployed copy with the modification more closely matches the configuration of the second master OS image, generating an association recommendation that recommends associating the deployed copy with a second update group of the second master OS image; and associating based on the association recommendation the deployed copy with the second update group of the second master OS image instead of the first update group of the first master OS image.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
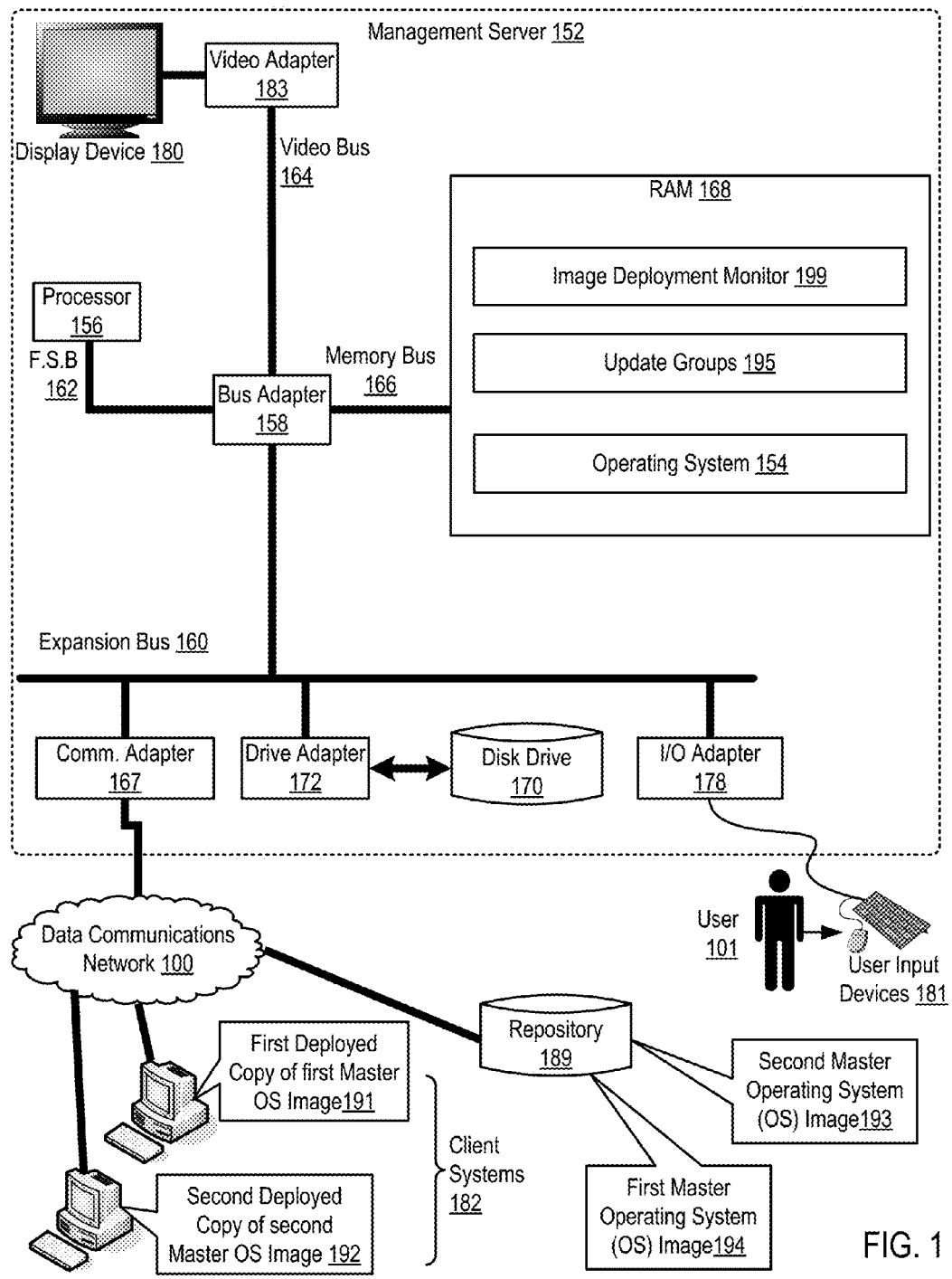
FIG. 1 sets forth a block diagram of automated computing machinery comprising an exemplary management server useful in dynamically recommending changes to an association between an operating system image and an update group according to embodiments of the present invention.

Exemplary methods, apparatuses, and computer program products for dynamically recommending changes to an association between an operating system image and an update group in accordance with the present invention are described with reference to the accompanying drawings, beginning with FIG. 1. Dynamically recommending changes to an association between an operating system image and an update group in accordance with the present invention is generally implemented with computers, that is, with automated computing machinery. For further explanation, therefore, FIG. 1 sets forth a block diagram of automated computing machinery comprising an exemplary management server (152) useful in dynamically recommending changes to an association between an operating system image and an update group according to embodiments of the present invention. The management server (152) of FIG. 1 includes at least one computer processor (156) or 'CPU' as well as random access memory (168) ('RAM'), which is connected through a high speed memory bus (166) and bus adapter (158) to processor (156) and to other components of the management server (152).

Stored in RAM (168) is an image deployment monitor (199) that includes computer program instructions for dynamically recommending changes to an association between an operating system image and an update group according to embodiments of the present invention. Specifically, the image deployment monitor (199) includes computer program instructions that when executed by the computer processor (156) cause the image deployment monitor (199) to carry out the step of monitoring a configuration of a deployed copy of a master operating system (OS) image. A configuration of an operating system image is a representation of the one or more settings, properties, or characteristics associated with the operating system image. For example, a configuration of a particular operating system (OS) image may indicate a version of an operation system included in the OS image; a listing of software included in the OS image; and versions of firmware or drivers associated with the OS image.

An image deployment monitor may be configured to monitor any number of deployed copies of any number of master OS images. In the example of FIG. 1, the image deployment monitor (199) is configured to monitor a first deployed copy (191) deployed from a first master OS image (194) and a second deployed copy (192) deployed from a second master OS image (193). Each deployed copy (191, 192) is stored on a client system (182) that is coupled to the management server (152) for monitoring by the image deployment monitor (199).

The image deployment monitor (199) may also be configured to associate each deployed copy with a particular update group. An update group is a collection of indications of deployed images. As updates for a particular master OS image become available, the image deployment monitor may transmit the update to the deployed copies associated with the update group of the particular master OS image.

The image deployment monitor (199) also includes computer program instructions that when executed by the computer processor (156) cause the image deployment monitor (199) to carry out the steps of detecting a modification in the configuration of the deployed copy; determining that the configuration of the deployed copy with the modification more closely matches a configuration of a second master OS image than a configuration of the first master OS image; in response to determining that the configuration of the deployed copy with the modification more closely matches the configuration of the second master OS image, generating an association recommendation that recommends associating the deployed copy with a second update group of the second master OS image; and associating based on the association recommendation the deployed copy with the second update group of the second master OS image instead of the first update group of the first master OS image.

For example, upon deployment, the first deployed copy (191) may be an exact copy of the first master OS image (194) and therefore is initially associated with an update group (195) of the first master OS image (194). After deployment, a user of the first deployed copy (191) may change the configuration of the first deployed copy (194) such that the changed configuration of the first deployed copy (191) more closely matches the configuration of the second master OS image (193). If the changed configuration of the first deployed copy (191) more closely matches the configuration of the second master OS image (193), according to embodiments of the present invention, the image deployment monitor (199) may recommend and change the association of the first deployed copy (191) to an update group of the second master OS image (193). For example when an update is available for the second master OS image (193), the image deployment monitor (199) may provide the update to the deployed copies associated the update group of the second master OS image (193), such as the first deployed copy (191) and the second deployed copy (192).

By changing an association between a deployed OS image and an update group, the image deployment monitor may keep deployed OS images updated with changes that are the most relevant to their configurations. Keeping updates relevant and closely aligned with a configuration of a deployed copy may help prevent configuration conflicts and failures between software modules, such as firmware, drivers, kernels, and applications on the deployed copy. Reducing software conflicts and failures may improve efficiency of a deployed copy and a user of the deployed copy.

Also stored in RAM (168) is an operating system (154). Operating systems useful dynamically recommending changes to an association between an operating system image and an update group according to embodiments of the present invention include UNIX™ Linux™ Microsoft XP™ AIX™ IBM's i5/OS™ and others as will occur to those of skill in the art. The operating system (154) and the image deployment monitor (199) in the example of FIG. 1 are shown in RAM (168), but many components of such software typically are stored in non-volatile memory also, such as, for example, on a disk drive (170).

The management server (152) of FIG. 1 includes disk drive adapter (172) coupled through expansion bus (160) and bus adapter (158) to processor (156) and other components of the management server (152). Disk drive adapter (172) connects non-volatile data storage to the management server (152) in the form of disk drive (170). Disk drive adapters useful in computers for dynamically recommending changes to an association between an operating system image and an update group according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example management server (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example management server (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary management server (152) of FIG. 1 includes a communications adapter (167) for data communications with the repository (189) and other computers, such as client computers (182) via a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for dynamically recommending changes to an association between an operating system image and an update group according to embodiments of the present invention include modems for wired dial-up communications, Ethernet (IEEE 802.3) adapters for wired data communications network communications, and 802.11 adapters for wireless data communications network communications.

Figure 2:
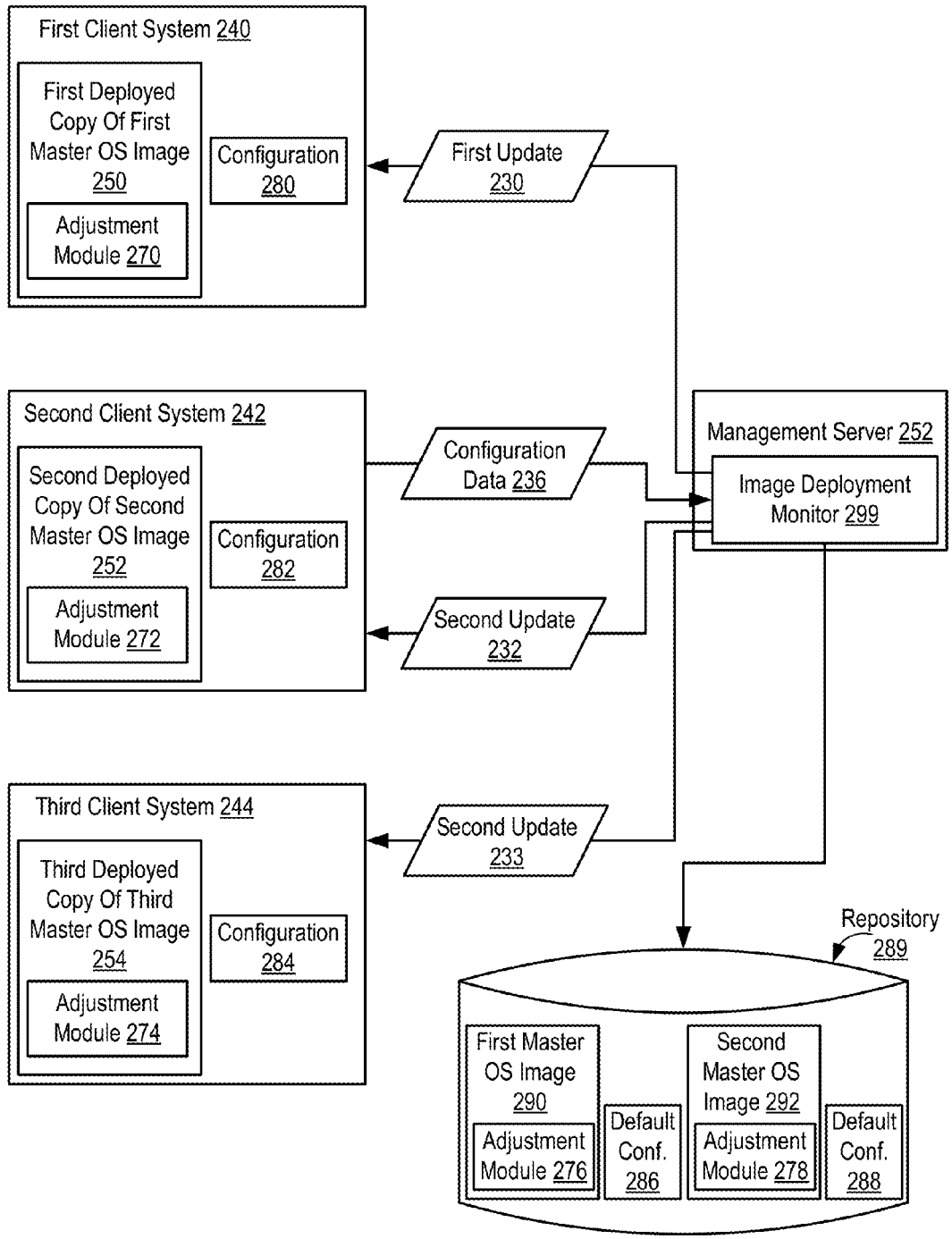
FIG. 2 sets forth a block diagram of a system comprising another example management server useful in dynamically recommending changes to an association between an operating system image and an update group according to embodiments of the present invention.

For further explanation, therefore, FIG. 2 sets forth a block diagram of a system comprising another example management server useful in dynamically recommending changes to an association between an operating system image and an update group according to embodiments of the present invention.

The system of FIG. 2 includes a management server (252) with an image deployment monitor (299) configured to monitor deployed copies of master OS images that are stored in a master OS image repository (289). In the example of FIG. 2, the image deployment monitor (299) monitors a first deployed copy (250) deployed from a first master OS image (290) and onto a first client system (240); a second deployed copy (252) deployed from the first master OS image (290) and onto a second client system (242), and a third deployed copy (254) deployed from a second master OS image (292) and onto a third client system (244). In the example of FIG. 2, only three deployed copies of two master OS images are illustrated but the image deployment monitor (299) may be configured to monitor any number of deployed copies of any number of master OS images.

As part of monitoring concurrently deployed copies, the image deployment monitor (299) may receive configuration data. Configuration data is data indicating changes that a user makes to a configuration of a deployed copy after a copy is deployed on a client system. Configuration data indicates changes to settings, properties, or characteristics of a deployed copy. Examples of configuration data include but are not limited to changes to an operating system level, child software stack, virtual hardware characteristics, and others as will occur to those of skill in the art.

In a particular embodiment, a monitoring agent may be installed at a client system to collect configuration data and transmit the collected configuration data to an image deployment monitor. A monitoring agent may be a software application that inspects the configuration of a deployed copy to detect changes to the default configuration of the deployed copy, such as updates to a kernel, changes to a software stack, and so on, and transmit these changes as configuration data. That is, the monitoring agent is configured to track the changes made by a user to a configuration after a copy of the master OS image is deployed onto a client system.

The image deployment monitor (299) may also be configured to associate each deployed copy with a particular update group. An update group is a collection of indications of deployed images. As updates for a particular master OS image become available, the image deployment monitor may transmit the update to the deployed copies associated with the update group of the particular master OS image. An update is a piece of software designed to fix a problem or update a computer program and its supporting data. This may include fixing security vulnerabilities, and other bugs, and improving the usability or performance. As used in this application, an update for a master OS image may include an update for any software module associated with the master OS image. For example, a particular application included with the operating system of a deployed copy may be updated by the developer of the application.

The image deployment monitor (299) may also be configured to detect a modification in the configuration of a deployed copy of a first master OS image and determine that the configuration of the deployed copy with the modification more closely matches a configuration of a second master OS image than a configuration of the first master OS image. The image deployment monitor (299) may also be configured to generate, in response to determining that the configuration of the deployed copy with the modification more closely matches the configuration of the second master OS image, an association recommendation that recommends associating the deployed copy with a second update group of the second master OS image; and associate based on the association recommendation the deployed copy with the second update group of the second master OS image instead of the first update group of the first master OS image.

For example, upon deployment, the first deployed copy (250) and the second deployed copy (252) may each be copies of the first master OS image (290) and therefore are initially associated with an update group of the first master OS image (290). Continuing with this example, the third deployed copy (254) may be an a copy of the second master OS image (292). That is, upon deployment, a configuration (280) of the first deployed copy (250), a configuration (282) of the second deployed copy (252), and a configuration (286) of the first master OS image (290) may indicate similar settings, characteristics, or properties, such as a version of an operating system, a version of a firmware or driver, or a listing of other software modules.

After deployment, a user of the second deployed copy (252) may change the configuration (282) of the second deployed copy (252) such that the changed configuration (282) of the second deployed copy (252) more closely matches the configuration (288) of the second master OS image (292). In this example, the second client system (242) may transmit configuration data (236) indicating changes to the configuration (282) of the second deployed copy (252). If the changed configuration (282) of the second deployed copy (252) more closely matches the configuration (288) of the second master OS image (292), according to embodiments of the present invention, the image deployment monitor (299) may recommend and change the association of the second deployed copy (252) to an update group of the second master OS image (292). For example when a first update (230) is available for the first master OS image (290), the image deployment monitor (299) may transmit the first update (230) to the deployed copies in the first update group of the first master OS image (290), such as the first deployed copy (250). In this example, because the association of the second deployed copy (252) was changed from the first update group of the first master OS image (290) to the update group of the second master OS image (292), the image deployment monitor (299) would not transmit the first update (230) to the second deployed copy (252).

Continuing with this example, when a second update (232) is available for the second master OS image (292), the image deployment monitor (299) may transmit the second update (232) to the deployed copies in the second update group of the second master OS image (292), such as the second deployed copy (252) and the third deployed copy (254). In this example, because the association of the second deployed copy (252) was changed from the first update group of the first master OS image (290) to the update group of the second master OS image (292), the image deployment monitor (299) would transmit the second update (232) to the second deployed copy (252).

In the example of FIG. 2, each OS image includes an adjustment module for implementing the updates received from the management server (252). For example, the first deployed copy (250) includes a first adjustment module (270), the second deployed copy (252) includes a second adjustment module (272), the third deployed copy includes a third adjustment module (274), the first master OS image (290) includes a first master adjustment module (276), and the second maser OS image (292) includes a second master adjustment module (288).

Figure 3:
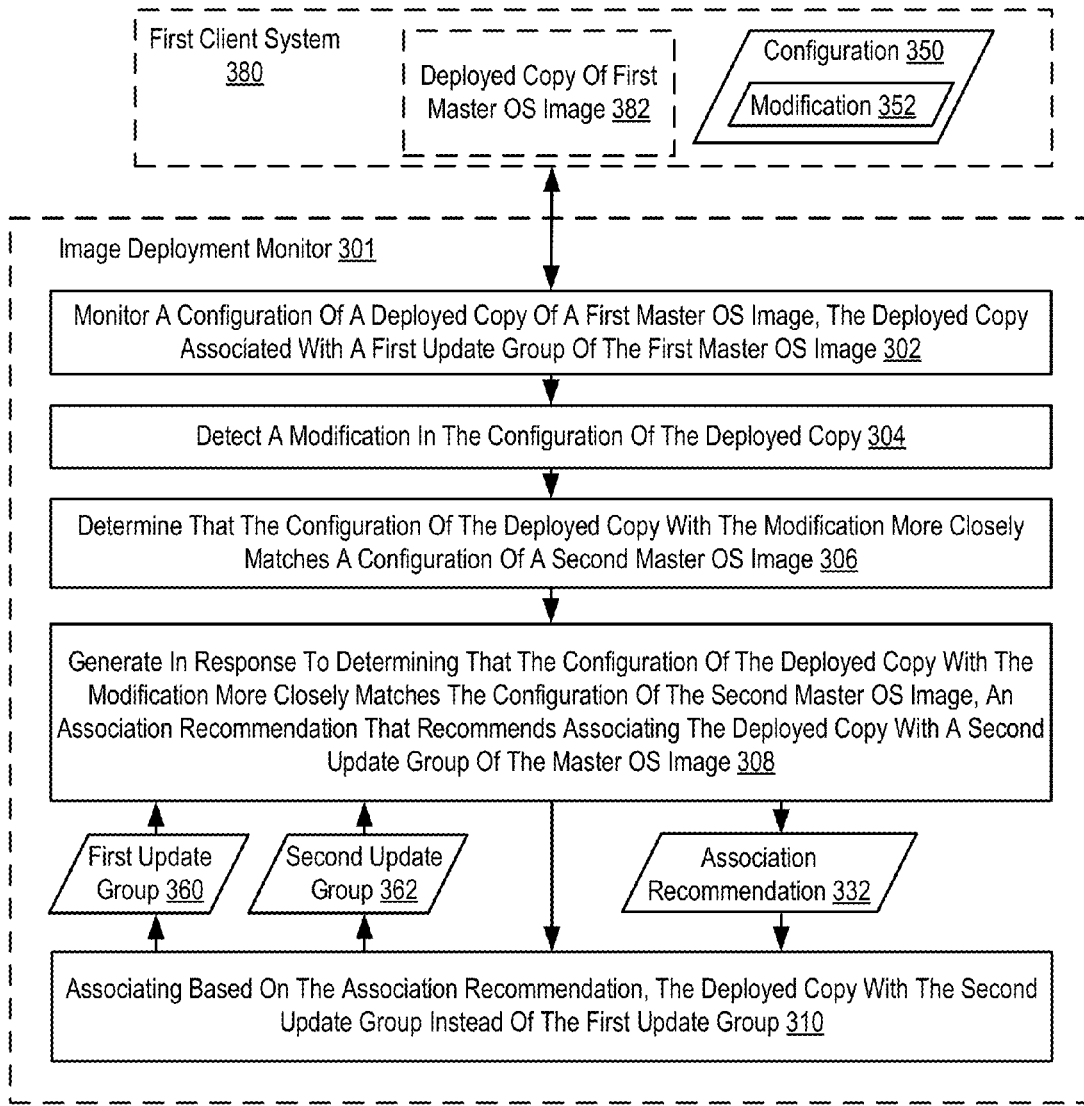
FIG. 3 sets forth a flow chart illustrating an exemplary method for dynamically recommending changes to an association between an operating system image and an update group according to embodiments of the present invention.
Figure 3:
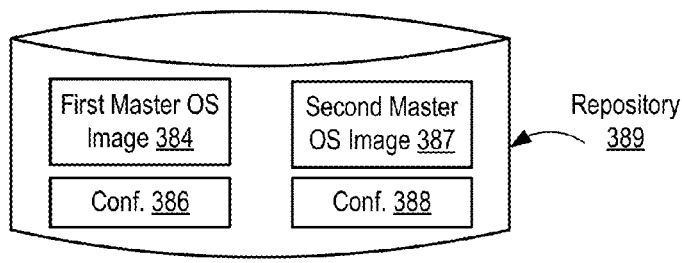

For further explanation, FIG. 3 sets forth a flow chart illustrating an exemplary method for dynamically recommending changes to an association between an operating system image and an update group according to embodiments of the present invention. The method of FIG. 3 includes monitoring (302), by an image deployment monitor (301), a configuration (350) of a deployed copy (382) of a first master operating system (OS) image (384). Monitoring (302) a configuration (350) of a deployed copy (382) of a first master operating system (OS) image (384) may be carried out by installing a monitoring agent on each deployed copy and receiving configuration data from each monitoring agent. A monitoring agent may be configured to monitor data metrics associated with the deployed copy, such as specific applications installed on a system and preferences related to those applications and transmit those changes as configuration data. Configuration data is data indicating changes made to a configuration after a copy is deployed on a client system. An example of configuration data includes indications of updates to a kernel, child software stack, virtual hardware characteristics, and others as will occur to those of skill in the art. Configuration data may be transmitted from a deployed copy to an image deployment monitor in response to specific events, such as when a client system boots or when new software is added to a configuration of a deployed copy. Configuration data may also be retrieved according to a set time schedule. In either case, an image deployment monitor may act as a management hub for collecting, reporting, and acting on the data metrics gathered by the monitoring agents.

The image deployment monitor may associate a deployed copy with an update group of a master OS image. An update group is a collection of indications of deployed images. As updates for a particular master OS image become available, the image deployment monitor may transmit the update to the deployed copies associated with the update group of the particular master OS image. Upon deployment, a deployed copy may be an exact copy of a particular master OS image and is therefore associated with an update group of the particular master OS image. After deployment, a user of the deployed copy may change the configuration of the deployed copy such that the changed configuration of the deployed copy more closely matches the configuration of another master OS image. If the changed configuration of the deployed copy more closely matches the configuration of the other master OS image, according to embodiments of the present invention, the image deployment monitor may change the association of the deployed copy to another update group of another master OS image. In the example of FIG. 3, the deployed copy (382) may initially be associated with a first update group (360) of the first master OS image (384).

The method of FIG. 3 also includes detecting (304), by the image deployment monitor (301), a modification (352) in the configuration (350) of the deployed copy (382). Detecting (304) a modification (352) in the configuration (350) of the deployed copy (382) may be carried out by examining configuration data received from each of the monitored deployed copies to identify configuration changes.

The method of FIG. 3 also includes determining (306), by the image deployment monitor (301), that the configuration (350) of the deployed copy (382) with the modification (352) more closely matches a configuration (388) of a second master OS image (387) than a configuration (386) of the first master OS image (384). Determining (306) that the configuration (350) of the deployed copy (382) with the modification (352) more closely matches a configuration (388) of a second master OS image (387) than a configuration (386) of the first master OS image (384) may be carried out by comparing one or more characteristics of the configuration (350) of the deployed copy (382) with one or more characteristics of the configurations (386, 388) of the master OS images (384, 387). For example, the image deployment monitor (299) may examine one or more of the following: version of operating system of the deployed copy; version of firmware on the deployed copy; and other listings of versions of software modules associated with the deployed copies.

The method of FIG. 3 also includes in response to determining that the configuration (350) of the deployed copy (382) with the modification (352) more closely matches the configuration (388) of the second master OS image (387), generating (308), by the image deployment monitor (301), an association recommendation (332) that recommends associating the deployed copy (382) with a second update group (362) of the second master OS image (387). Generating (308), by the image deployment monitor (301), an association recommendation (332) that recommends associating the deployed copy (382) with a second update group (362) of the second master OS image (387) may be carried out by generating a message or storing an internal value indicating that a deployed copy has one or more characteristics more in common with another master OS image.

The method of FIG. 3 also includes associating (310) based on the association recommendation (332), by the image deployment monitor (301), the deployed copy (382) with the second update group (362) of the second master OS image (387) instead of the first update group (360) of the first master OS image (384). Associating (310) based on the association recommendation (332), the deployed copy (382) with the second update group (362) of the second master OS image (387) instead of the first update group (360) of the first master OS image (384) may be carried out by storing an indication of the deployed copy on a list with other deployed copies that are associated with the second master OS image and deleting the indication of the deployed copy from a list containing indication of deployed copies associated with the first master OS image.

Figure 4:
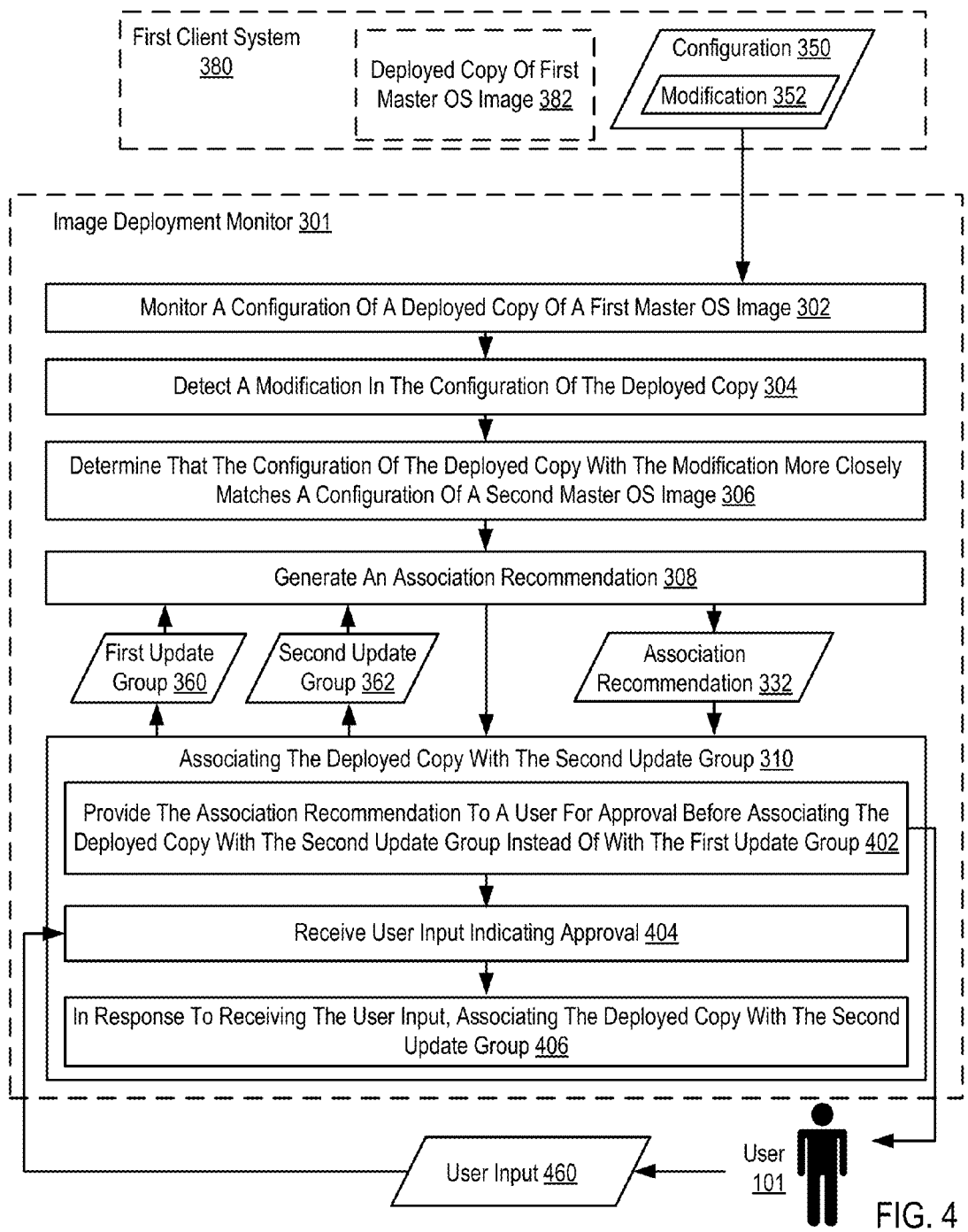
FIG. 4 sets forth a flow chart illustrating another exemplary method for dynamically recommending changes to an association between an operating system image and an update group according to embodiments of the present invention.

For further explanation, FIG. 4 sets forth a flow chart illustrating another exemplary method for dynamically recommending changes to an association between an operating system image and an update group according to embodiments of the present invention. The method of FIG. 4 is similar to the method of FIG. 3 in that the method of FIG. 4 also includes: monitoring (302) a configuration (350) of a deployed copy (382) of a first master operating system (OS) image (384); detecting (304) a modification (352) in the configuration (350) of the deployed copy (382); determining (306) that the configuration (350) of the deployed copy (382) with the modification (352) more closely matches a configuration (388) of a second master OS image (387) than a configuration of the first master OS image (384); in response to determining that the configuration (350) of the deployed copy (382) with the modification (352) more closely matches the configuration (388) of the second master OS image (387), generating (308) an association recommendation (332) that recommends associating the deployed copy (382) with a second update group (362) of the second master OS image (387); and associating (310) based on the association recommendation (332), the deployed copy (382) with the second update group (362) of the second master OS image (387) instead of the first update group (360) of the first master OS image (384).

In the method of FIG. 4, however, associating (310) based on the association recommendation (332), the deployed copy (382) with the second update group (362) of the second master OS image (387) instead of the first update group (360) of the first master OS image (384) includes providing (402) the association recommendation (332) to a user (101) for approval. Providing (402) the association recommendation (332) to a user (101) for approval may be carried out by presenting a user with an option to change the association of a deployed copy from one master OS image to another master OS image.

In the method of FIG. 4, however, associating (310) based on the association recommendation (332), the deployed copy (382) with the second update group (362) of the second master OS image (387) instead of the first update group (360) of the first master OS image (384) also includes receiving (404) from the user (101), user input (460) indicating approval to associate the deployed copy (382) with the second update group (362). Receiving (404) from the user (101), user input (460) indicating approval to associate the deployed copy (382) with the second update group (362) may be carried out by receiving an indication that the user approves of the change in association.

In the method of FIG. 4, however, associating (310) based on the association recommendation (332), the deployed copy (382) with the second update group (362) of the second master OS image (387) instead of the first update group (360) of the first master OS image (384) also includes in response to receiving the user input (460), associating (406) the deployed copy (382) with the second update group (362). Associating (406) the deployed copy (382) with the second update group (362) in response to receiving the user input (460) may be carried out by storing an indication of the deployed copy on a list with other deployed copies that are associated with the second master OS image; and deleting the indication of the deployed copy from a list containing indication of deployed copies associated with the first master OS image.

Figure 5:
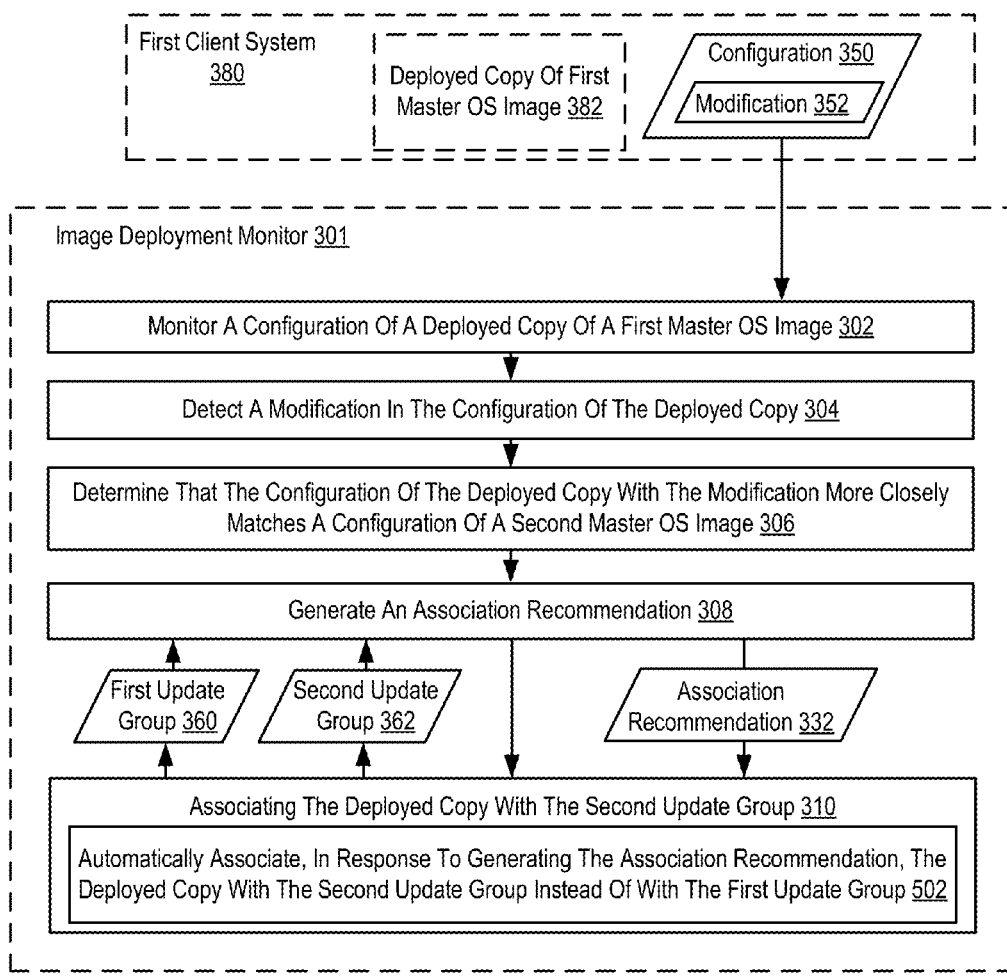
FIG. 5 sets forth a flow chart illustrating another exemplary method for dynamically recommending changes to an association between an operating system image and an update group according to embodiments of the present invention.
Figure 5:
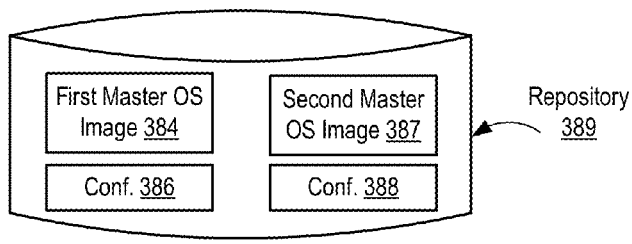

For further explanation, FIG. 5 sets forth a flow chart illustrating another exemplary method for dynamically recommending changes to an association between an operating system image and an update group according to embodiments of the present invention. The method of FIG. 5 is similar to the method of FIG. 3 in that the method of FIG. 5 also includes: monitoring (302) a configuration (350) of a deployed copy (382) of a first master operating system (OS) image (384); detecting (304) a modification (352) in the configuration (350) of the deployed copy (382); determining (306) that the configuration (350) of the deployed copy (382) with the modification (352) more closely matches a configuration (388) of a second master OS image (387) than a configuration of the first master OS image (384); in response to determining that the configuration (350) of the deployed copy (382) with the modification (352) more closely matches the configuration (388) of the second master OS image (387), generating (308) an association recommendation (332) that recommends associating the deployed copy (382) with a second update group (362) of the second master OS image (387); and associating (310) based on the association recommendation (332), the deployed copy (382) with the second update group (362) of the second master OS image (387) instead of the first update group (360) of the first master OS image (384).

In the method of FIG. 5, however, associating (310) based on the association recommendation (332), the deployed copy (382) with the second update group (362) of the second master OS image (387) instead of the first update group (360) of the first master OS image (384) includes automatically associating (502) based on the association recommendation (332), the deployed copy (382) with the second update group (362) in response to generating the associating recommendation (332). Automatically associating (502) based on the association recommendation (332), the deployed copy (382) with the second update group (362) in response to generating the associating recommendation (332) may be carried out by storing an indication of the deployed copy on a list with other deployed copies that are associated with the second master OS image; and deleting the indication of the deployed copy from a list containing indication of deployed copies associated with the first master OS image.

Figure 6:
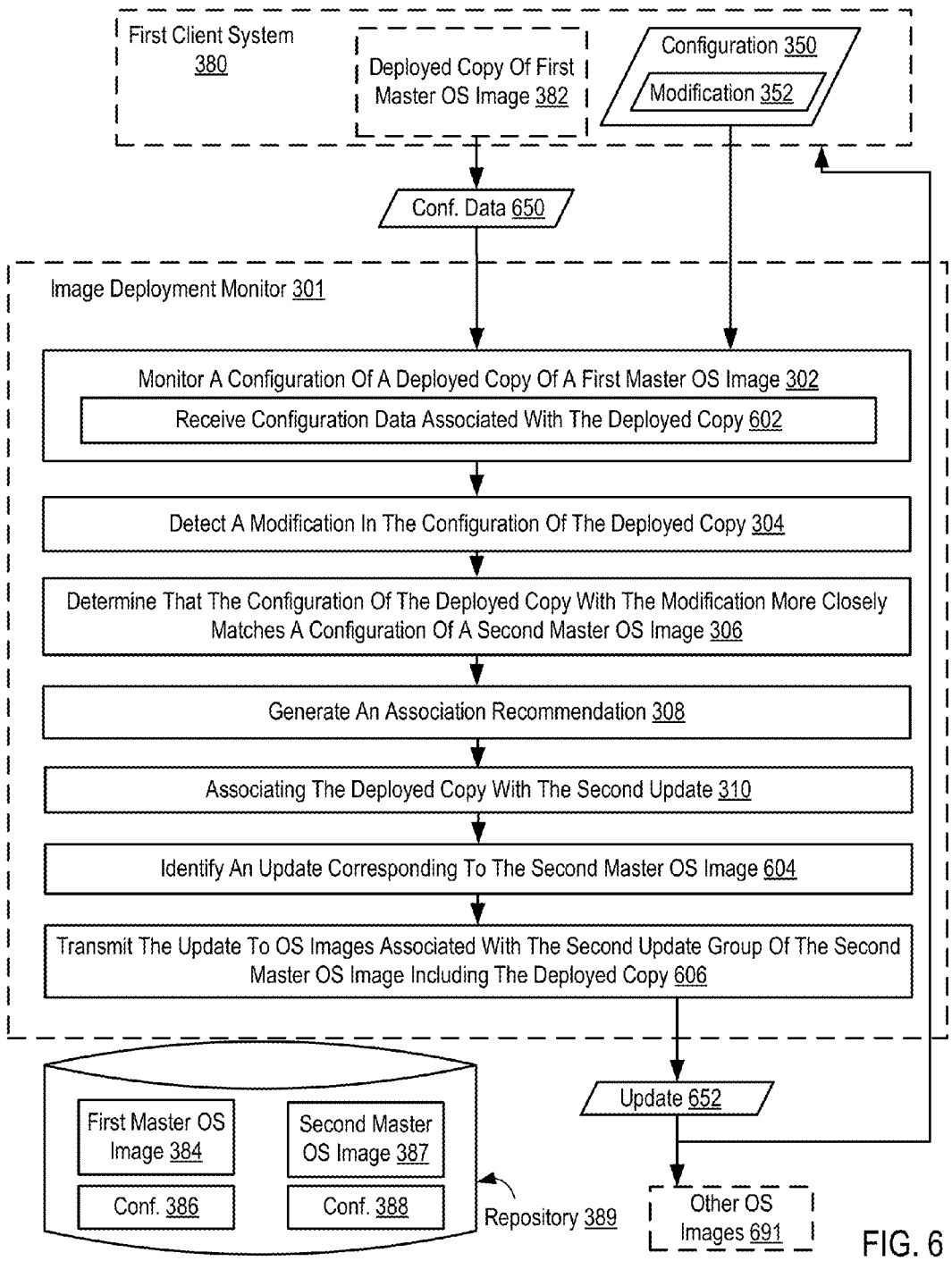
FIG. 6 sets forth a flow chart illustrating another exemplary method for dynamically recommending changes to an association between an operating system image and an update group according to embodiments of the present invention.

For further explanation, FIG. 6 sets forth a flow chart illustrating another exemplary method for dynamically recommending changes to an association between an operating system image and an update group according to embodiments of the present invention. The method of FIG. 6 is similar to the method of FIG. 3 in that the method of FIG. 6 also includes: monitoring (302) a configuration (350) of a deployed copy (382) of a first master operating system (OS) image (384); detecting (304) a modification (352) in the configuration (350) of the deployed copy (382); determining (306) that the configuration (350) of the deployed copy (382) with the modification (352) more closely matches a configuration (388) of a second master OS image (387) than a configuration of the first master OS image (384); in response to determining that the configuration (350) of the deployed copy (382) with the modification (352) more closely matches the configuration (388) of the second master OS image (387), generating (308) an association recommendation (332) that recommends associating the deployed copy (382) with a second update group (362) of the second master OS image (387); and associating (310) based on the association recommendation (332), the deployed copy (382) with the second update group (362) of the second master OS image (387) instead of the first update group (360) of the first master OS image (384).

In the method of FIG. 6, however, monitoring (302) a configuration (350) of a deployed copy (382) of a first master operating system (OS) image (384) includes receiving (602) from the deployed copy (382), configuration data (650) associated with the deployed copy (382). In the example of FIG. 6, the modification in the configuration of the deployed copy is detected based on the configuration data.

Receiving (602) from the deployed copy (382), configuration data (650) associated with the deployed copy (382) may be carried out by receiving messages from one or more monitoring agents monitoring the deployed copy.

The method of FIG. 6 also includes identifying (604), by the image deployment monitor (301), an update (652) corresponding to the second master OS image (387). Identifying (604), by the image deployment monitor (301), an update (652) corresponding to the second master OS image (387) may be carried out by determining that there is one or more kernel, driver, or software updates available to deployed copies of a particular master OS image.

The method of FIG. 6 also includes transmitting (606), by the image deployment monitor (301), the update (652) to OS images (691) associated with the second update group (362) of the second master OS image (387) including the deployed copy (382). Transmitting (606) the update (652) to OS images (691) associated with the second update group (362) of the second master OS image (387) including the deployed copy (382) may be carried out by using direct or indirect communication to communicate; identifying which deployed copies have not implemented the change; and sending the configuration recommendation to those deployed copies.

Exemplary embodiments of the present invention are described largely in the context of a fully functional computer system for dynamically recommending changes to an association between an operating system image and an update group. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of dynamically recommending changes to an association between an operating system image and an update group, the method comprising:
   detecting, by the image deployment monitor, a modification in a configuration of a deployed copy of a first master operating system (OS) image, the deployed copy associated with a first update group of the first master OS image;
   determining, by the image deployment monitor, that the configuration of the deployed copy with the modification more closely matches a configuration of a second master OS image than a configuration of the first master OS image;
   in response to determining that the configuration of the deployed copy with the modification more closely matches the configuration of the second master OS image,
   associating, by the image deployment monitor, the deployed copy with the second update group of the second master OS image instead of the first update group of the first master OS image.

2. The method of claim 1 wherein associating based on the association recommendation, the deployed copy with the second update group of the second master OS image includes:
   providing the association recommendation to a user for approval;
   receiving from the user, user input indicating approval to associate the deployed copy with the second update group; and
   in response to receiving the user input, associating the deployed copy with the second update group.

3. The method of claim 1 wherein associating based on the association recommendation, the deployed copy with the second update group of the second master OS image includes automatically associating based on the association recommendation, the deployed copy with the second update group in response to generating the associating recommendation.

4. The method of claim 1 further comprising:
   identifying, by the image deployment monitor, an update corresponding to the second master OS image; and
   transmitting, by the image deployment monitor, the update to OS images associated with the second update group of the second master OS image including the deployed copy.

5. The method of claim 1 further comprising monitoring, by the image deployment monitor, a configuration of a deployed copy including receiving from the deployed copy, configuration data associated with the deployed copy; wherein the modification in the configuration of the deployed copy is detected based on the configuration data.

6. The method of claim 5 wherein the configuration data is transmitted to the image deployment monitor by the deployed copy in response to at least one of installation of a software module on the deployed copy and booting of a system upon which the deployed copy is deployed.

7. An apparatus for dynamically recommending changes to an association between an operating system image and an update group, the apparatus comprising a computer processor, a computer memory operatively coupled to the computer processor, the computer memory having disposed within it computer program instructions that when executed by the computer processor cause the apparatus to carry out the steps of:
   detecting, by the image deployment monitor, a modification in a configuration of a deployed copy of a first master operating system (OS) image, the deployed copy associated with a first update group of the first master OS image;
   determining, by the image deployment monitor, that the configuration of the deployed copy with the modification more closely matches a configuration of a second master OS image than a configuration of the first master OS image;
   in response to determining that the configuration of the deployed copy with the modification more closely matches the configuration of the second master OS image,
   associating, by the image deployment monitor, the deployed copy with the second update group of the second master OS image instead of the first update group of the first master OS image.

8. The apparatus of claim 7 wherein associating based on the association recommendation, the deployed copy with the second update group of the second master OS image includes:
   providing the association recommendation to a user for approval;
   receiving from the user, user input indicating approval to associate the deployed copy with the second update group; and
   in response to receiving the user input, associating the deployed copy with the second update group.

9. The apparatus of claim 7 wherein associating based on the association recommendation, the deployed copy with the second update group of the second master OS image includes automatically associating based on the association recommendation, the deployed copy with the second update group in response to generating the associating recommendation.

10. The apparatus of claim 7 further comprising computer program instructions that when executed by the computer processor cause the apparatus to carry out the steps of:
    identifying, by the image deployment monitor, an update corresponding to the second master OS image; and
    transmitting, by the image deployment monitor, the update to OS images associated with the second update group of the second master OS image including the deployed copy.

11. The apparatus of claim 7 further comprising computer program instructions that when executed by the computer processor cause the apparatus to carry out the step of monitoring, by the image deployment monitor, a configuration of a deployed copy including receiving from the deployed copy, configuration data associated with the deployed copy; wherein the modification in the configuration of the deployed copy is detected based on the configuration data.

12. The apparatus of claim 11 wherein the configuration data is transmitted to the image deployment monitor by the deployed copy in response to at least one of installation of a software module on the deployed copy and booting of a system upon which the deployed copy is deployed.

13. A computer program product for dynamically recommending changes to an association between an operating system image and an update group, the computer program product disposed upon a computer readable memory, the computer program product comprising computer program instructions that when executed by a computer processor cause a computer to carry out the steps of:
- detecting, by the image deployment monitor, a modification in a configuration of a deployed copy of a first master operating system (OS) image, the deployed copy associated with a first update group of the first master OS image;
- determining, by the image deployment monitor, that the configuration of the deployed copy with the modification more closely matches a configuration of a second master OS image than a configuration of the first master OS image;
- in response to determining that the configuration of the deployed copy with the modification more closely matches the configuration of the second master OS image,
- associating, by the image deployment monitor, the deployed copy with the second update group of the second master OS image instead of the first update group of the first master OS image.

14. The computer program product of claim 13 wherein associating based on the association recommendation, the deployed copy with the second update group of the second master OS image includes:
- providing the association recommendation to a user for approval;
- receiving from the user, user input indicating approval to associate the deployed copy with the second update group; and
- in response to receiving the user input, associating the deployed copy with the second update group.

15. The computer program product of claim 13 wherein associating based on the association recommendation, the deployed copy with the second update group of the second master OS image includes automatically associating based on the association recommendation, the deployed copy with the second update group in response to generating the associating recommendation.

16. The computer program product of claim 13 further comprising computer program instructions that when executed by a computer processor cause a computer to carry out the steps of:
- identifying, by the image deployment monitor, an update corresponding to the second master OS image; and
- transmitting, by the image deployment monitor, the update to OS images associated with the second update group of the second master OS image including the deployed copy.

17. The computer program product of claim 13 further comprising computer program instructions that when executed by the computer processor cause the computer to carry out the step of monitoring, by the image deployment monitor, a configuration of a deployed copy including receiving from the deployed copy, configuration data associated with the deployed copy; wherein the modification in the configuration of the deployed copy is detected based on the configuration data.

18. The computer program product of claim 17 wherein the configuration data is transmitted to the image deployment monitor by the deployed copy in response to at least one of installation of a software module on the deployed copy and booting of a system upon which the deployed copy is deployed.

* * * * *